3,349,086
Patented Oct. 24, 1967

3,349,086

PROCESS FOR THE PREPARATION OF ASYMMETRIC AMINO TRIAZINE DERIVATIVES

Ralph Raphael George Haber, 42 Kaplansky St., Givatayim, Israel

No Drawing. Filed Nov. 8, 1963, Ser. No. 322,517
Claims priority, application Israel, Nov. 16, 1962, 18,236, 18,237; Oct. 24, 1963, 20,126
9 Claims. (Cl. 260—240)

The present invention relates to a new process for the preparation of asymmetric amino triazine derivatives. The invention also relates to new glyoxal derivatives which are obtained as intermediates in the course of the new process.

The present invention consists in a process for the preparation of asymmetric amino triazine derivatives of general Formula I

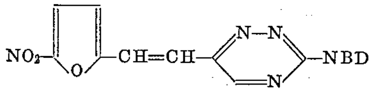

in which B and D stand each for hydrogen, lower alkyl or R'CO, R' standing for lower alkyl, wherein 5-nitrofurfurylidene acetone is reacted with selenium dioxide with heating in an inert solvent (hereinafter called solvent I) or water in a mixture thereof to yield a glyoxal derivative of general Formula II

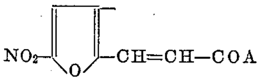

in which A stands for CHO or $CH(OH)_2$, and, if desired, the glyoxal derivative obtained is reacted with water, a lower alkyl or benzyl alcohol or a carboxylic acid anhydride to yield a glyoxal derivative of general Formula III

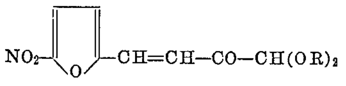

in which R stands for hydrogen, lower alkyl, benzyl or R'CO, R' standing for lower alkyl, and then a glyoxal derivative of either Formula II or III is reacted with an aminoguanidine or one of its salts of general Formula IV $$H_2NNH-\overset{\overset{NH}{\|}}{C}-NB'D'$$

in which B' and D' stand each for hydrogen or lower alkyl, with heating in an inert solvent (hereinafter called solvent II) and, if desired, the compound obtained is acylated.

The second step of the process, according to the invention, i.e. the reaction of the glyoxal derivative with the aminoguanidine is preferably carried out at pH 7.5–9.0.

An inert solvent in connection with the present invention means an organic solvent which is inert towards the compounds participating in the reaction step and towards the compound obtained by said step.

The preferred solvent I are dioxane and acetic acid, preferably admixed with water, and the preferred solvent II is a lower alkyl alcohol such as methanol.

The exocyclic double bond is, surprisingly, practically not attacked under the reaction conditions, according to the invention.

The amino triazine derivatives of general Formula I are known to possess antibacterial properties.

The glyoxal derivatives of general Formula V

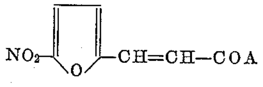

in which A stands for CHO or for $CH(OR)_2$, R standing for hydrogen, lower alkyl, benzyl or R'CO, R' standing for lower alkyl, which are obtained in the process, according to the invention, as intermediates, are new compounds, which have themselves antibacterial properties.

The invention will be illustrated by the following examples without being limited by them. All temperatures are indicated in degrees Celsius.

*Example 1*

9.05 g. of 5-nitrofurfurylidene acetone (M.P. 114–115°), 45 ml. of dioxane, 5 ml. of water and 6.1 g. of selenium dioxide were placed in a 250 ml. three-necked flask provided with a mechanical stirrer and a reflux condenser. The stirred mixture was heated on a water bath and after about 30 minutes finely powdered selenium appeared. Heating was continued to a total of 4 hours, the mixture was then cooled to room temperature and decanted off from the selenium. 50 ml. of water and 6 g. of active charcoal were added to the decanted mixture, which was heated to 50° and filtered hot. The yellow clear filtrate was concentrated in vacuo to 30 ml. whereby a light brown product precipitated. The mixture was cooled to 0° and the precipitate obtained filtered off to yield 9.1 g. of 5-nitrofurfurylidene pyruvaldehyde hydrate. After recrystallisation from water the compound had a M.P. of 111–113°.

*Analysis.*—Calculated for $C_8H_7NO_6$; C, 45,08%; H, 3.31%; N, 6.57%. Found: C, 45.28%; H, 3.46%; N, 6.29%.

*Example 2*

A solution of 4.8 g. of 5-nitrofurfurylidene acetone in 15 ml. of dioxane was added to a clear solution of 4.8 g. of selenium dioxide in 22 ml. of dioxane and 3 ml. of water at 60°. The mixture was boiled for 4 hours, cooled and filtered. 40 ml. of water and 5 g. of active charcoal were added to the filtrate which was filtered again. The new filtrate was concentrated to a third of its initial volume and the dark yellow crystals precipitating were filtered off to yield 3.45 g. of 5-nitrofurfurylidene pyruvaldehyde hydrate, M.P. 109–110°. Another 0.95 g. of the product was obtained by the further concentration of the filtrate.

*Example 3*

1.6 g. of 5-nitrofurfurylidene acetone, 1.6 g. of selenium dioxide and 15 ml. of 90% aqueous dioxane were admixed, the mixture was boiled for 4 hours, then cooled and filtered. The filtrate was treated with active charcoal, filtered again and evaporated to dryness. A thick viscous oil, being 5-nitrofurfurylidene pyruvaldehyde, was obtained. High vacuum distillation was impossible since violent decomposition took place. The crude material could be transformed into acetals or diacylates and could be used in the preparation of amino triazine derivatives of Formula I.

*Example 4*

The crude 5-nitrofurfurylidene pyruvaldehyde obtained in Example 3 was dissolved in 15 ml. of acetic anhydride, a drop of sulfuric acid was added to the solution which was then refluxed for 15 minutes. After cooling the solution was poured on 50 g. of ice and the mixture stirred for 3 hours. The precipitate formed was filtered off to yield 2 g. of 5-nitrofurfurylidene pyruvaldehyde diacetate, M.P. 106–107°. After recrystallisation from methanol the M.P. rose to 109–111°.

*Analysis.*—Calculated: C, 48.49%; H, 3.73%. Found: C, 48.76%; H, 3.87%.

*Example 5*

2.13 g. of 5-nitrofurfurylidene pyruvaldehyde hydrate, prepared as described in Example 1, 1.36 g. of aminoguanidine bicarbonate and 50 ml. of methanol were placed in a 100 ml. three-necked flask equipped with a mechanical stirrer and a reflux condenser. The suspension obtained was refluxed for 20 minutes and then cooled in an ice-bath. The precipitate obtained was filtered off to yield 2.05 g. of brown crystals. The crystals were dissolved in dilute hydrochloric acid, activated charcoal was added to the solution, which was then filtered. The filtrate was neutralised with potassium bicarbonate and the precipitate obtained, having a dark orange colour, was filtered off to yield 3-amino-6-(5'-nitrofuryl-2'-ethenyl)-1,2,4-triazine, M.P. 269–271°. After recrystallisation from acetone the melting point rose to 272–273°. The ultraviolet spectrum showed maxima at 292 and 396 mμ and the infrared spectrum had characteristic bands at 2.82, 2.96, 3.09, 6.01, 6.05 and 13.55 microns, besides the finger-print region.

*Example 6*

1.5 g. of nitrofurfurylidene pyruvaldehyde diacetate, prepared as described in Example 4, was dissolved in 50 ml. of methanol and 0.7 g. of finely powdered aminoguanidine bicarbonate was added to the solution obtained. The colour changed from light yellow to brown. The mixture was refluxed for 15 minutes, cooled and filtered. The filtrate was heated with activated charcoal, filtered and the new filtrate concentrated to a small volume. Water was added and the precipitate obtained was filtered off, dissolved in acetone and the solution obtained was filtered through a short silica gel column. The eluate was stripped off to dryness to give a red material, being 3-amino-6-(5'-nitrofuryl-2'-ethenyl)-1,2,4-triazine, M.P. 262–266°.

*Example 7*

2.13 g. (0.01 mol) of 5-nitrofurfurylidene pyruvaldehyde hydrate, prepared as described in Example 1, was dissolved in 50 ml. of methanol with heating. A solution of 2.29 g. (0.01 mol) of α-methylaminoguanidine HI in 20 ml. of water, adjusted by $Na_2CO_3$ to pH 7.5, was added to the methanolic solution. The colour changed from colourless to dark yellow. $KHCO_3$ was added during the reaction in order to keep the pH always at 7.5. The solution was refluxed for 0.5 hour with stirring, was then cooled to room temperature, concentrated in vacuo to half of its volume and the brown precipitate obtained was filtered off. This precipitate was dissolved in aqueous HCl, the solution filtered with charcoal. After the addition of $NaHCO_3$, a reddish precipitate was obtained which after recrystallisation from acetone yielded 0.7 g. of crude 3-(N-methyl)-amino-6-(5'-nitrofuryl-2'-ethenyl)-1,2,4-triazine, M.P. 217–217.5°.

What I claim is:

1. A process for the preparation of asymmetric amino triazine derivatives comprising, reacting an amino compound having the formula:

$$H_2NNH-\overset{\overset{NH}{\|}}{C}-NB'D'$$

wherein B' and D' are selected from the group consisting of hydrogen and lower alkyl by heating said amino compound in the presence of an inert solvent with a compound selected from the group consisting of (1) a glyoxal derivative formed by heating 5-nitrofurylidene acetone with selenium dioxide in the presence of a solvent selected from the group consisting of inert organic solvents, water and mixtures thereof, said glyoxal derivatives having the formula:

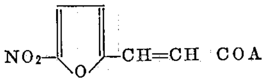

wherein A is selected from the group consisting essentially of —CHO and —$CH(OH)_2$, and (2) a compound formed by the reaction product of the glyoxal derivative having the formula:

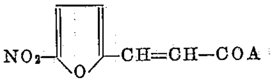

wherein A is selected from the group consisting of —CHO and —$CH(OH)_2$ with a material selected from the group consisting of water, lower alkyl, benzyl, alcohol and carboxy acid anhydride and having the formula:

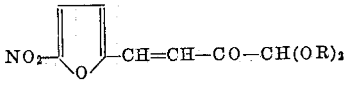

wherein R is selected from the group consisting of hydrogen, lower alkyl, benzyl and R'CO wherein R' is a lower alkyl.

2. The process of claim 1, wherein said glyoxal derivative is formed in the presence of a solvent which is dioxane.

3. The process of claim 1, wherein said glyoxal derivative is formed in the presence of a solvent which is acetic acid.

4. A process according to claim 1, wherein said amino compound is heated in the presence of a solvent which is methanol.

5. A process according to claim 1, wherein said amino compound is reacted at a pH of from about 7.5 to 9.0.

6. A glyoxal derivative of the formula:

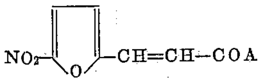

in which A stands for CHO or $CH(OR)_2$, R standing for hydrogen, lower alkyl, benzyl or R'CO, R' standing for lower alkyl.

7. 5-nitrofurfurylidene pyruvaldehyde.

8. 5-nitrofurfurylidene pyruvaldehyde hydrate.

9. 5-nitrofurfurylidene pyruvaledehyde diacetate.

References Cited

UNITED STATES PATENTS

| | | | |
|---|---|---|---|
| 3,151,110 | 9/1964 | Kodama et al. | 260—240 |
| 3,153,649 | 10/1964 | Kodama et al. | 260—240 |
| 3,159,624 | 12/1964 | Kodama et al. | 260—240 |

FOREIGN PATENTS

| | | |
|---|---|---|
| 755,036 | 8/1956 | Great Britain. |

OTHER REFERENCES

Erickson et al.: The 1,2,3- and 1,2,4-Triazines, Tetrazines and Pentazines, pages 51 to 56, Interscience Publishers, Inc., New York (1956).

Miura et al.: J. Pharm. Soc., Japan, vol. 81, pages 1357–1358 (1961).

Miura et al.: J. Pharm. Soc., Japan, vol. 82, pages 1464–1467 (November 1962).

Stein: Angewandte chemie, vol. 54, pages 146 to 152 (1941).

JOHN D. RANDOLPH, *Primary Examiner.*